United States Patent
Jarvis

(10) Patent No.: US 11,927,983 B2
(45) Date of Patent: Mar. 12, 2024

(54) TIME SYNCHRONIZATION FOR COMPUTATIONAL SYSTEM

(71) Applicant: L3Harris Technologies, Inc., Melbourne, FL (US)

(72) Inventor: Matthew Jarvis, Mason, OH (US)

(73) Assignee: L3Harris Technologies, Inc., Melbourne, FL (US)

( * ) Notice: Subject to any disclaimer, the term of this patent is extended or adjusted under 35 U.S.C. 154(b) by 192 days.

(21) Appl. No.: 17/543,003

(22) Filed: Dec. 6, 2021

(65) Prior Publication Data

US 2023/0176609 A1   Jun. 8, 2023

(51) Int. Cl.
*G06F 1/12* (2006.01)

(52) U.S. Cl.
CPC .................. *G06F 1/12* (2013.01)

(58) Field of Classification Search
CPC .............. G06F 1/32; G06F 9/44; G06F 1/12
See application file for complete search history.

(56) References Cited

U.S. PATENT DOCUMENTS

| | | | |
|---|---|---|---|
| 6,389,041 B1* | 5/2002 | Morita | G06F 1/12 375/357 |
| 2018/0159219 A1* | 6/2018 | Vehovc | H04B 17/11 |

\* cited by examiner

*Primary Examiner* — Keshab R Pandey
(74) *Attorney, Agent, or Firm* — Edell, Shapiro & Finnan, LLC

(57) ABSTRACT

Provided for herein are systems, methods, apparatus and software configured synchronize clocks across two or more processing devices. The techniques of the present disclosure include: obtaining, at a processing device, indications of clocks, wherein the indications comprise an indication for a clock for each of a plurality of processing devices; determining, from the indications, whether a clock of the processing device leads or lags a majority of clocks of the plurality of processing devices; and adjusting the clock of the processing device in a direction of the majority of the clocks of the plurality of processing devices.

20 Claims, 16 Drawing Sheets

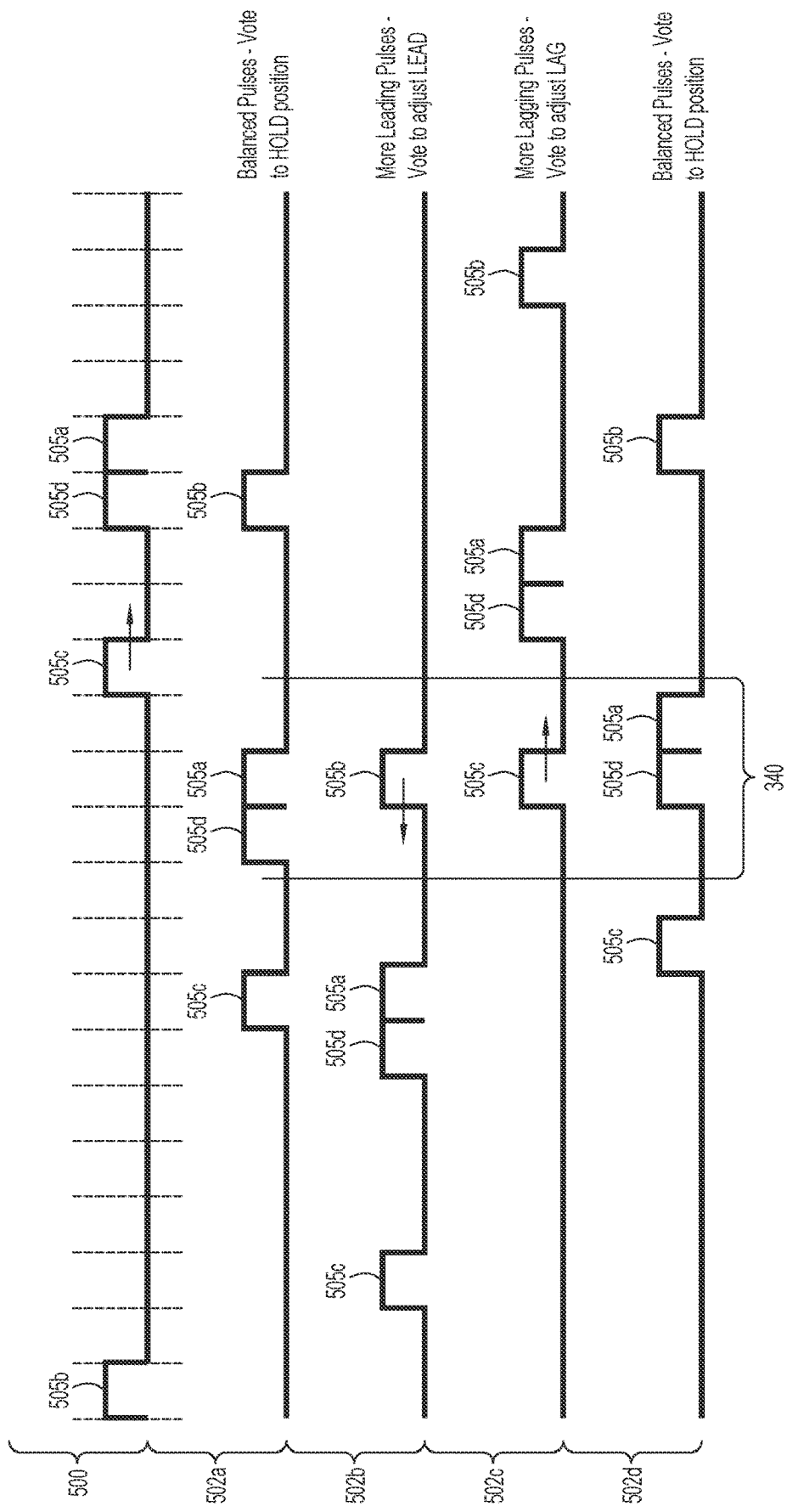

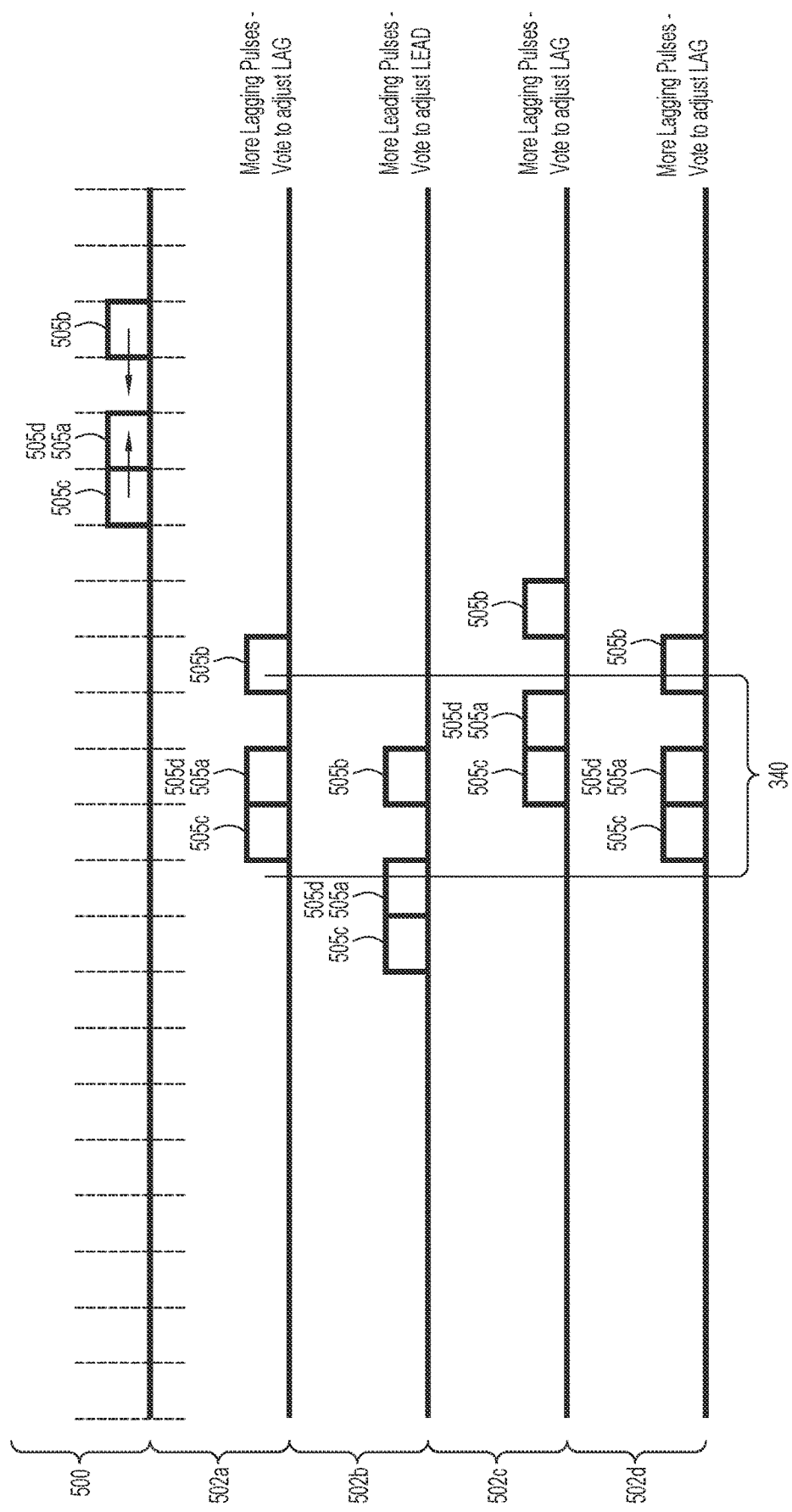

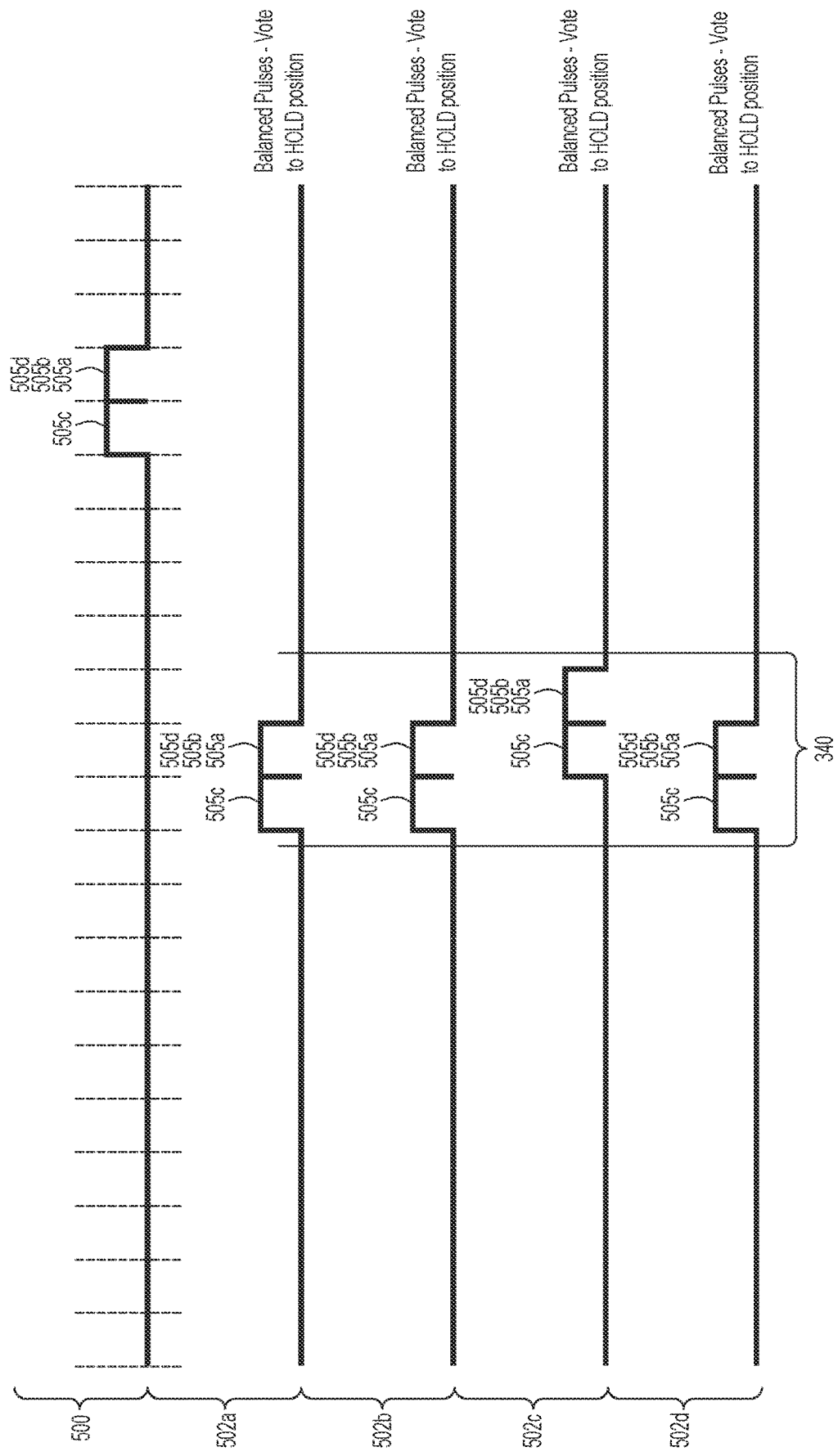

Figure 1:
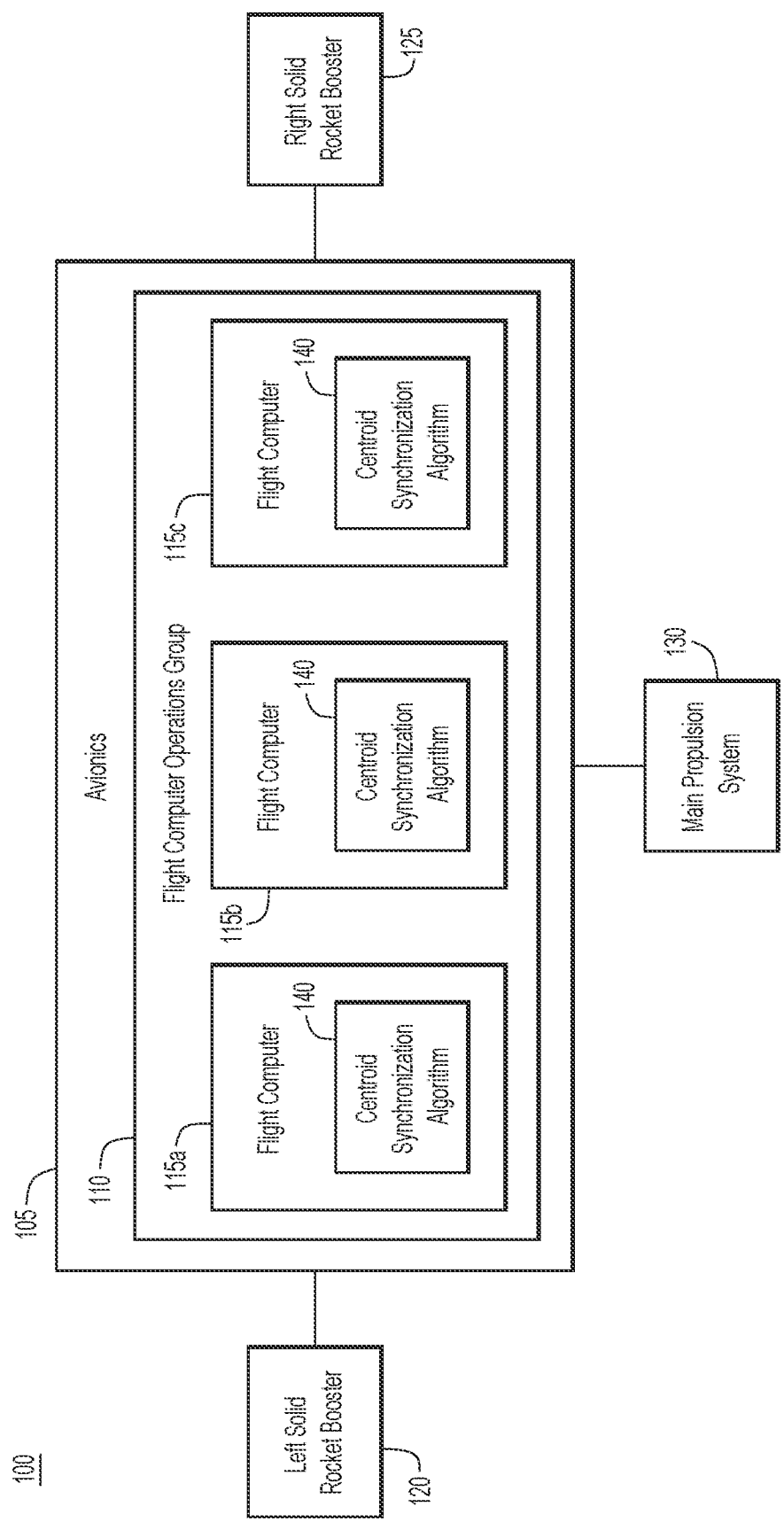

TIME SYNCHRONIZATION FOR COMPUTATIONAL SYSTEM

TECHNICAL FIELD

The present disclosure relates to synchronizing clocks across two or more processing devices.

BACKGROUND

To allow a computational group (such as a flight computer operations group) to make critical decisions synchronously while operating with individual asynchronous clock sources, there must be a common synchronization algorithm running on each unit that will allow each individual in the group to keep a copy of a common synchronized event timer that computations and decisions can be aligned with. Providing each individual unit with the same copy of the algorithm such that each unit comes to the same conclusion of what the ideal synchronized time should presents a challenged. This is because each unit will see the entire operating group from their own unique perspective (or reference frame). Thus, each unit will see a different set of inputs compared to each other unit in the group, but must all units must come to the same adjustment conclusion.

Multiple algorithms have attempted to address this challenged, but each algorithm presents had various problems or drawbacks. For example, leader/follower synchronization approaches attempt to designate a leader pulse from the group by declaring the first pulse appearing in the cluster to be the leader and all other pulses attempt to adjust their local pulse generators to follow this leader pulse. Yet, in such systems it is possible for two systems to come online within a close enough time frame that they would both want to declare themselves the leader, which could create a synchronization issue that could only be solved by a reset of the algorithm. Leader/follower synchronization approaches may also be susceptible to drift issues if the designated leader has more pronounced local clock drift issues than the rest of the units in the group.

Second edge techniques attempt to find the second leading edge of the entire group once all units are running. The units that are not the second edge make adjustments to synchronize to the second edge pulse. Yet, similar to leader/follower techniques, it is possible to have a group power on such that more than one unit could be selected as the second edge, which would confuse the settings in the group. It is also possible for the group to become confused when units drop out of the cluster, particularly if the second edge drops from the group.

BRIEF DESCRIPTION OF THE DRAWINGS

FIG. 1 provides a block diagram of a computational group, specifically a flight computer operations group, configured to implement the techniques of the present disclosure, according to an example embodiment.

FIG. 2 illustrates a plurality of clock sources, and a phase comparison thereof, according to an example embodiment.

FIG. 3 illustrates a comparison of clock source phases and accompanying analysis windows utilized in the clock synchronization techniques of the present disclosure, according to an example embodiment.

FIG. 4 illustrates a plurality of clock sources, and a phase comparison thereof, in which an outlier clock source is brought into synchronization using the clock synchronization techniques of the present disclosure, according to an example embodiment.

FIGS. 5A-5G present an implementation of the clock synchronization techniques of the present disclosure, according to an example embodiment.

FIG. 6 is a flowchart illustrating a first method for implementing the clock synchronization techniques of the present disclosure, according to an example embodiment.

FIG. 7 is a flowchart illustrating a second method for implementing the clock synchronization techniques of the present disclosure, according to an example embodiment.

FIG. 8 is a functional block diagram of processing elements configured to implement the clock synchronization techniques of the present disclosure, according to an example embodiment.

FIG. 9 illustrates logic configured to implement the clock synchronization techniques of the present disclosure, according to an example embodiment.

FIG. 10 is a functional block diagram of an apparatus configured to implement the clock synchronization techniques of the present disclosure, according to an example embodiment.

DESCRIPTION OF EXAMPLE EMBODIMENTS

Overview

Provided for herein are systems, methods, apparatus and software configured synchronize clocks across two or more processing devices. According to a first example embodiment, a method is provided for that includes: obtaining, at a processing device, indications of clocks, wherein the indications comprise an indication of a clock for each of a plurality of processing devices; determining, from the indications, whether a clock of the processing device leads or lags a majority of clocks of the plurality of processing devices; and adjusting the clock of the processing device in a direction of the majority of the clocks of the plurality of processing devices.

According to a second example embodiment, a second method is provided for that includes: sharing, among a plurality of processing devices, indications of a clock for each of the plurality of processing devices; determining, at each of the plurality of processing devices, whether a local clock of a respective one of the plurality of processing devices leads or lags a majority of the clocks for others of the plurality of processing devices; and adjusting, at each of the plurality of processing devices, the clock of the respective one of the plurality of processing devices in a direction of the majority of the clocks of the others of the plurality of processing devices.

The present disclosure also provides for apparatuses, systems and computer readable media encoded with instructions, each of which are configured to implement operations analogous to those of the above-described methods.

EXAMPLE EMBODIMENTS

With reference now made to FIG. 1, illustrated therein is a functional block diagram 100 of a spacecraft avionics system 105, to which the techniques of the present disclosure may be applied. As understood by the skilled artisan, spacecraft avionics systems and flight computers are just one application to which the techniques of the present disclosure may be applied, and the techniques described herein are not limited to such implementations. Instead, the techniques of the present disclosure may be applied to any environment, system or apparatus where clocks are intended to be synchronized.

Included in avionics systems 105 is a flight computer operations group (FCOG) 110 that includes three flight computers 115a-c. Avionics system 105 controls, for example, the left solid rocket booster 120 of the spacecraft, the right solid rocket booster 125 of the spacecraft, and the main propulsion system 130 of the spacecraft. To allow flight computers 115a-c of FCOG 110 to make critical decisions synchronously while operating with individual asynchronous clock sources, there must be a common synchronization algorithm running on each of flight computers 115a-c to keep a copy of a common synchronized event timer that computations and decisions can be aligned with. For example, in some implementations, each of flight computers 115a-c may need an internal event flag every 1 ms, and each of flight computers 115a-c in FCOG 110 must do this at the same time even though each of flight computers 115a-c will execute the internal event according to its own system clock. Because the system clocks of flight computers 115a-c would otherwise be asynchronous, a common synchronization algorithm is needed to synchronize the otherwise asynchronous system clocks of flight computers 115a-c.

Providing such an algorithm may present a challenge as each of flight computers 115a-c should come to the same conclusion of what the ideal synchronized time should be even though each of flight computers 115a-c will view the different clock signals from their own unique perspective (or reference frame). Accordingly, each of flight computers 115a-c will see a different set of inputs compared to each other, but all of flight computers 115a-c must nevertheless come to the same synchronization conclusion. Reaching this conclusion may be complicated by the fact that each of flight computers 115a-c may power on at a different time, and each of flight computers 115a-c has a clock source with unique drift characteristics.

Accordingly, in the example embodiment of FIG. 1, each of flight computers 115a-c executes a centroid synchronization algorithm 140 according to the techniques of the present disclosure. Centroid synchronization algorithm 140 is based on the concept of defining the phase centroid of a cluster of pulses generated by the clock signals of flight computers 115a-c. Specifically, if a pulse indicative of a phase of an internal clock of each of flight computers 115a-c is added to a group. This group may consist of a cluster of periodic pulses whose phases are randomly distributed within the group upon initial operating conditions of flight computers 115a-c. According to example embodiments of centroid synchronization algorithm 140, if the pulse associated with a local clock is defined as having a 0° phase, looking forward and backward in the group by 180° (i.e., covering a full 360°) will show the pulses associated with the clocks of the other flight computers 115a-c. Algorithm 140 will look to see if more pulses fall to the right or left of the local pulse, and this will tell algorithm 140 if it needs to shift its phase leading or lagging to have the phase of the local clock approach the centroid of the group. If each of flight computers 115a-c utilizes synchronization algorithm 140 to bring the phase of its local clock to the centroid of FCOG 110, the system clocks for each of flight computers 115a-c may all come to the same centroid conclusion, no matter how much their individual clock signals are initially out of phase.

During the synchronization process, when all of the pulses for each of flight computers 115a-c are brought sufficiently close together, centroid synchronization algorithms 140 may utilize a hysteresis system that aims to create smaller, more deliberate changes to each local pulse with respect to the group by ensuring that if an adjustment decision were to be made, that it would have been made consistently several times before actually applying the change. This hysteresis system may filter out errant readings and provide a damping factor to the feedback so that clock adjustments will not enter oscillation by attempting to match another clock signal that has just made its own adjustment.

Centroid synchronization algorithms 140 may also utilize multiple concentric analysis windows around the local 0° point of each of flight computers 115a-c that determine what the necessary loop response is to keep the respective flight computers 115a-c locked as close as possible to the centroid of FCOG 110.

Through the use of centroid synchronization algorithm 140, the system clocks of flight computers 115a-c may be synchronized with increased uniformity and efficiency when compared with certain related art techniques. With respect to uniformity, each of centroid synchronization algorithm 140 may use the exact same logic in each of flight computers 115a-c. Accordingly, there is no need for unique designations for any one of flight computers 115a-c. For example, there is no need to designate any one of flight computers 115a-c as "leader" of the group. Centroid synchronization algorithm 140 may also be implemented to be modular and infinitely scalable. Accordingly, centroid synchronization algorithm 140 may support any number of computational units (e.g., any number of flight computers 115a-c) with no change to the algorithm. Furthermore, computational units may be dropped or added at any time, in real time, to a computation group (e.g., FCOG 110), and the added computational units may be folded into the group seamlessly.

With respect to efficiency, centroid synchronization algorithm 140 may reduce the resource burden needed in any unit (e.g., any flight computer 115a-c) to run the logic needed to implement centroid synchronization algorithm 140. Implementations of centroid synchronization algorithm 140 may use an order of magnitude fewer resources than certain related art algorithms. Furthermore, centroid synchronization algorithm 140 may be significantly easier and faster to implement in a field programmable gate array (FPGA) design. Though, the techniques of the present disclosure are not limited to FPGA implementations. Instead, the techniques of the present disclosure may be implemented through a variety of processing devices, including general or multi-purpose processing devices, such as central processing units (CPUs), and application-specific integrated circuits (ASICs), as well as the above-mentioned FPGAs and others.

Centroid synchronization algorithm 140 also provides additional benefits in that the mathematical techniques used in the algorithm pull the system clocks of flight computers 115a-c toward the central statistical drift point of all the individual source clocks of flight computers 115a-c, which is the optimal place for any computational group to attempt to synchronize to.

Figure 2:
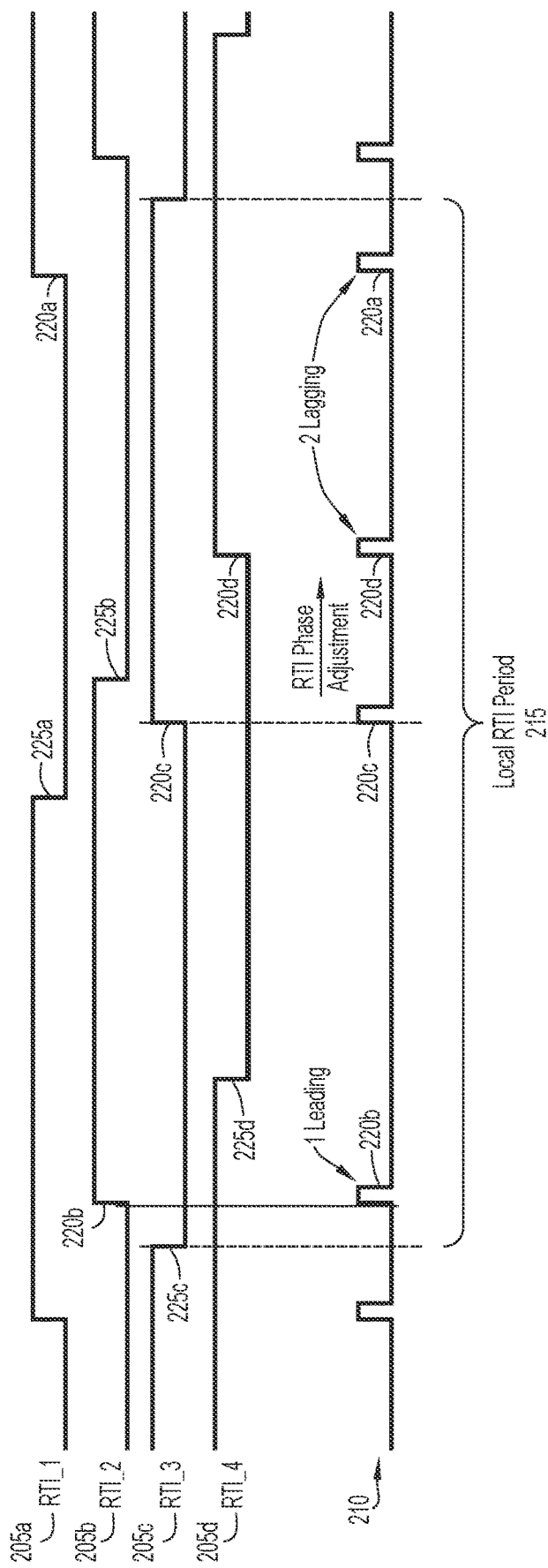

With reference now made to FIG. 2, more specific example embodiments of the techniques of the present disclosure will now be described. Depicted in FIG. 2 are a series of clock sources 205a-d, as well as a phase alignment chart 210 of the relative phase between the clock sources from the perspective of clock source 205c. According to the example embodiment of FIG. 2, clock sources 205a-d are embodied as real time interrupts, or RTIs. In an FCOG, RTIs are used to flag computational events internally, as well as to synchronize with the other members of the FCOG. Clock sources 205a-d may be clock sources from individual flight computers of an FCOG, such as flight computers 115a-c of FCOG 110 of FIG. 1. Though, clock sources 205a-d may be clock sources for any group of clock sources what should be synchronized. Specifically, phase alignment chart 210 compares the phase between each of clock sources 205a-d by considering the relative phase between the clock sources over one local clock period 215 for clock source 205c.

According to specific example embodiments, time period 215 may be designated by generics at compile time. Clock source 205c may then consider the rising edge 220c of time period 215 as the middle of a search window with which the processing device associated with clock source 205c will look for the other clock source rising edges 220a, 220b and 220b. Based upon the detected rising edges 220a-d, the processing device associated with clock source 205c determines if the phase of clock sources 205a, 205b and 205d lead or trail that of clock source 205c. In response to this analysis of clock sources 205a-d, the processing device associated with clock source 205c may make phase adjustments to clock source 205c in subsequent clock periods to move clock source 205c towards the side that has more edges, as explained in detail below. If the processing devices associated with each of clock sources 205a-d each perform this same processing, each of the processing devices may make adjustments to move the rising edge of clock sources 205a-d towards the centroid of the group. As a result, the processing devices associated with clock sources 205a-d may synchronize clock sources 205a-d to the arithmetic mean of the drifts of all clock sources 205a-d, which is the most efficient place for the group to synchronize to, as it represents the least amount of adjustments over time that the group may make to stay locked together.

According to the specific example embodiment of FIG. 2, the difference in phase for clock sources 205a-d is determined by comparing the rising edges 220a-d within local time period 215 for clock source 205c. Though, other example embodiments may use other features of clock sources 205a-d so long as the feature is determinative of the relative phase between clock sources 205a-d, such as the falling edges 225a-d.

Figure 3:
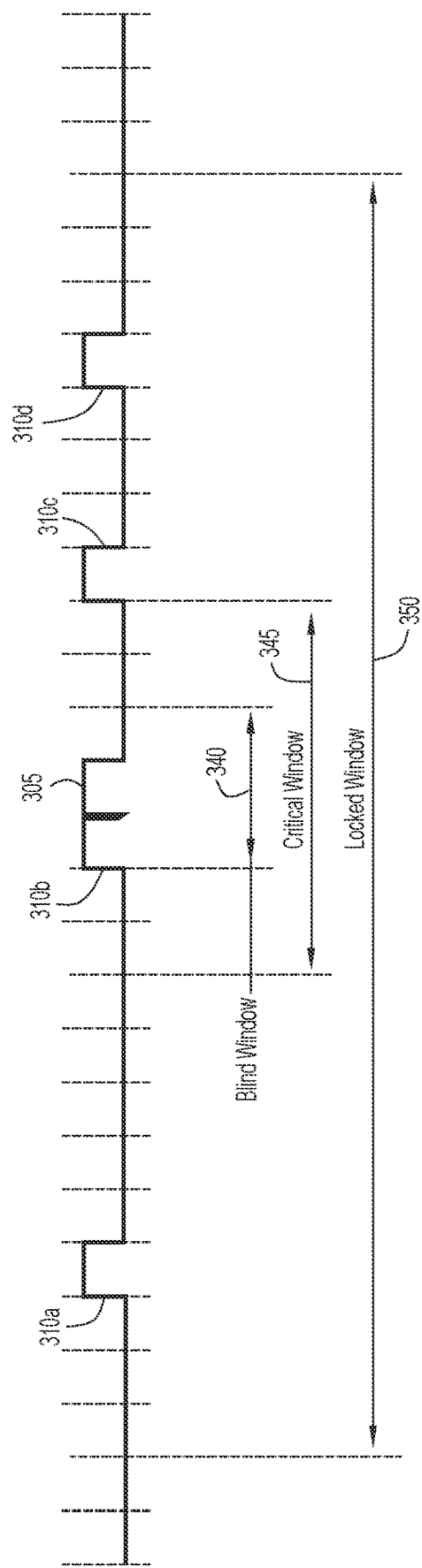

As shown, clock source 205b leads clock source 205c as its rising edge 220b comes prior to rising edge 220c for clock source 205c within local time period 215. Clock sources 205a and 205d, on the other hand, trail clock source 205c as their rising edges 220a and 220d, respectively, come subsequent to rising edge 220c for clock source 205c within local time period 215. Because there are a greater number of clock sources that lag clock source 205c, specifically clock sources 205a and 205d, clock source 205c will be adjusted towards lagging clock sources 205a and 205d. At the same time, each of the other clock sources 205a, 205b and 205d will be undergoing a similar process, as illustrated in FIGS. 5A-G, which will bring all of the clock sources into synchronization With reference now made to FIG. 3, depicted therein are a three time windows which may be used to affect the amount of adjustment that clock sources undertake, according to example embodiments. Specifically, illustrated in FIG. 3 are a blind window 340, a critical window 345 and a locked window 350. More specifically, the presence or absence of leading or lagging clock sources within one or more of these time windows may affect how the local clock source 305 is adjusted relative to the other clock sources 310a-c.

The smallest window, blind window 340, represents a window with which the presence of another clock source will not affect the adjustments made to local clock source 305. This window is referred to as a "blind" window, because any phase differences between local clock source 305 and other clock sources that fall within this blind window will not be considered when determining if and how much adjustment to make to local clock source 305. In other words, local clock source 305 will be "blind" to the presence of external clocks within this window for purposes of making phase adjustments.

The purpose of "blinding" clock source 305 to the presence of clocks within the blind window 340 is to eliminate oscillations from quantization error in multi-feedback systems. Due to the presence of multiple clocks, there are multiple feedback loops. If two clocks' edges are less than one system clock cycle from each other (for instance if they are misaligned by only a ½ clock), the two clocks may tend to go into oscillation as the two clocks bounce back and forth trying to move their respective local clocks to that imaginary place in between clocks (i.e., a ½ clock) that they can never reach. Accordingly, blind window 340, which is a single-clock-sized window on each side of the local edge pulse in the embodiment of FIG. 3, makes the system blind to this oscillation-inducing error, preventing the above-described oscillations. Other embodiments of the techniques of the present disclosure may implement blind windows with sizes different from those illustrated in FIG. 3.

According to the example of FIG. 3, local clock source 305 will be "blind" to the phase difference of clock source 310b. Therefore, clock source 310b will not affect the direction of correction that local clock source 305 undergoes, resulting in local clock source 305 being adjusted in the direction in which the majority of clock sources 310a, 310c and 310d are located, in this instance, towards the right of FIG. 3. In situations where all of the clock sources fall within the blind window 340, no adjustment will be made to local clock source 305. In other words, when all of the clock sources fall within the blind window 340, the clock sources are essentially synchronized. According to specific example embodiments, the size of blind window 340 may be set based upon the maximum accuracy with which a clock source signal may be adjusted. Blind window 340 may be set to this size to avoid marginally stable oscillations from the quantization error inherent in sampling at the system clock rate, which introduces a discrete maximum accuracy for the distance that may be calculated between two edges.

Critical window 345 is used to determine the amount or rate of adjustment that is made to local clock source 305. When one or more of clock sources 310a-d are within critical window 345 the techniques of the present disclosure assume that the local clock source 305 is coming close to the group centroid and therefore smaller or less frequent adjustments are made to reduce fine jitter. Adjustments will still be made, and the adjustments will still be in the direction towards the majority of clock sources outside of blind window 340, but the amount of adjustment or rate thereof may be decreased. Decreasing the amount or frequency of adjustment in this way may avoid oscillations from constant fine adjustments due to the delay in feedback from clock sources 310a-d to local clock source 305.

On the other hand, if all of clock sources 310a-d are outside of critical window 345, the adjustment amount made to local clock source 305 may be made larger because it may be assumed that local clock source 305 is not close to alignment/synchronization with clock sources 310a-d, and therefore, more coarse adjustments may be necessary.

The use of critical window 345 in the techniques of the present disclosure allows each processing device to use the critical window 345 to deduce if that processing device is itself the outlier, and therefore, adjust its own gain to fix the outlying condition and rejoin the group. An illustration of this behavior is shown in FIG. 4.

For completeness, it is noted that clocks within blind window 340 are considered to be within critical window 345. Being within blind window 340 does not "blind" a clock for purposes of determining if clocks are within critical window 345.

Figure 4:
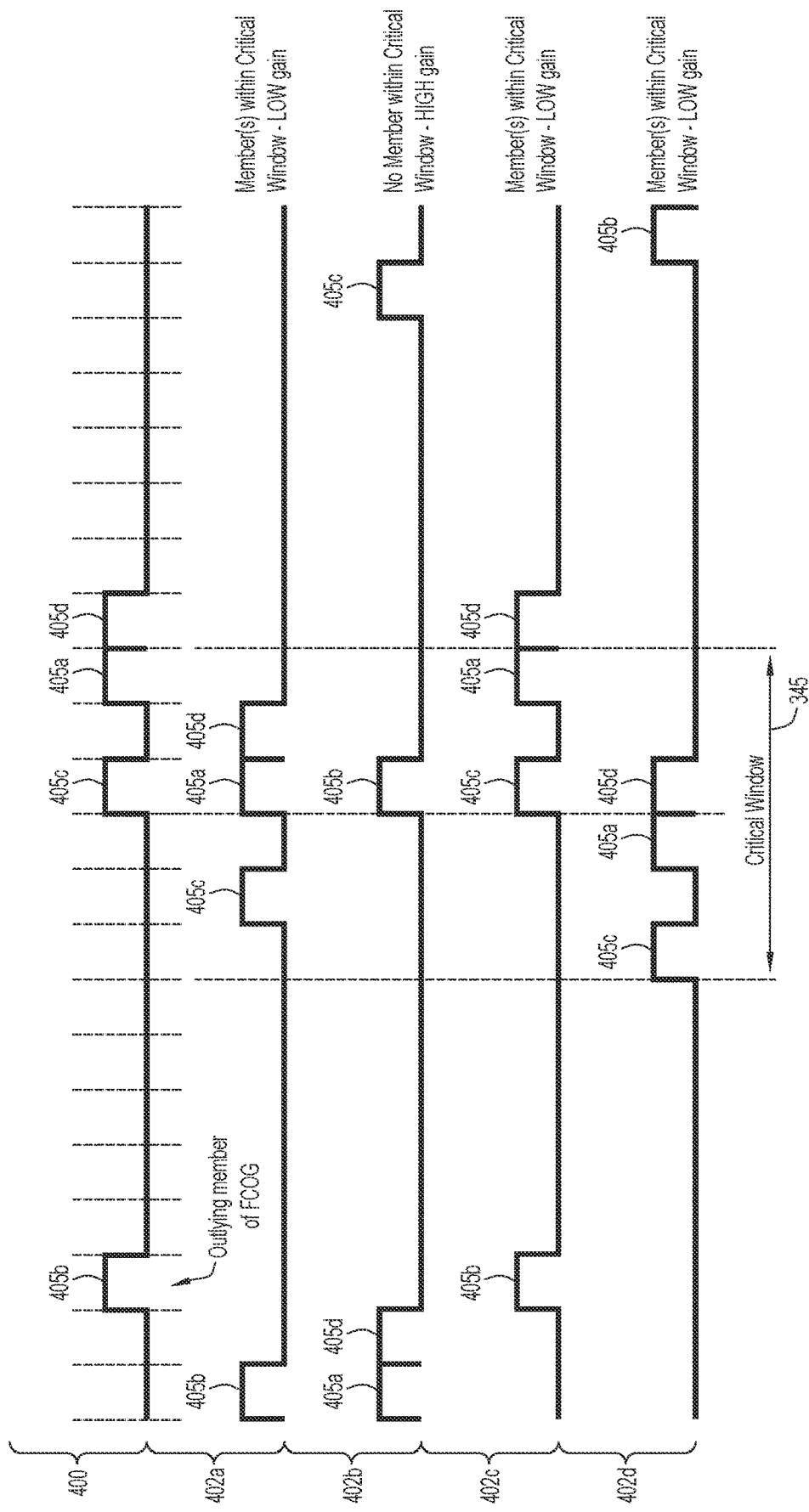

With reference made to FIG. 4, and as depicted in phase alignment chart 400, clock source 405b is the outlier relative to clock sources 405a, 405c and 405d, i.e., clock source 405b is outside the critical window 345 with respect to each of clock sources 405a, 405c and 405d. Clock sources 405a, 405c and 405d, on the other hand, are close to synchronization with each other. Accordingly, it would be efficient for clock source 405b to make coarse adjustments to bring it into synchronization with clock sources 405a, 405c and 405d. As shown through phase alignment charts 402a-d, which illustrate the relative phase of phase alignment chart 400 from the perspective of clock sources 405a-d, respectively, only clock source 405b sees all of the other clock sources outside of critical window 345. Therefore, only clock source 405b will make coarse adjustments.

Specifically, phase alignment chart 402b shows the relative phases of clock sources 405a-d from the perspective of clock source 405b. As shown in phase alignment chart 402b, clock sources 405a, 405c and 405d are all outside of critical window 345. As there are no clock sources within critical window 345 from the perspective of clock source 405b, clock source 405b will make coarse adjustments, which in this case will be towards the left of FIG. 4.

Phase alignment chart 402a shows the relative phases of clock sources 405a-d from the perspective of clock source 405a. As shown in phase alignment chart 402a, clock sources 405c and 405d are within critical window 345 from the perspective of clock source 405a. Therefore, clock source 405a will only make fine adjustments, which in this case will be towards the left of FIG. 4.

Phase alignment chart 402c shows the relative phases of clock sources 405a-d from the perspective of clock source 405c. As shown in phase alignment chart 402c, clock source 405a is within critical window 345. Therefore, clock source 405c will make fine adjustments, which in this case will be towards the right of FIG. 4.

Finally, phase alignment chart 402d shows the relative phases of clock sources 405a-d from the perspective of clock source 405d. As shown in phase alignment chart 402d, clock sources 405a and 405c are within critical window 345. Therefore, clock source 405d will make fine adjustments, which in this case will be towards the left of FIG. 4.

Accordingly, the use of critical window 345 allows clock source 405b to determine it is the outlier. Therefore, clock source 405b will make coarse adjustments while the other clock sources 405a, 405c and 405d will make fine adjustments.

Returning to FIG. 3, the final window illustrated therein is a locked window 350. When clock sources are found outside of locked window 350, the techniques of the present disclosure may implement the adjustment techniques at a highest possible rate. Specifically, if any clock sources are found outside of locked window 350, it may be determined that at least one of the clock sources is significantly out of phase with one or more of the other clock sources. By implementing the techniques of the present disclosure at a higher rate, such outlier clock sources may be brought into synchronization more quickly. Once all clock sources are found within locked window 350, the rate of adjustment of the local clock sources may be decreased.

With reference now made to FIGS. 5A-5G, one specific example embodiment of implementing the techniques of the present disclosure will now be described. For purposes of the example embodiment of FIGS. 5A-5G, the effects of the critical window 345 and the locked window 350 of FIG. 3 are not described, though the skilled artisan would understand that the concepts described herein with respect to the critical window 345 and the locked window 350 may incorporated into the example embodiment of FIGS. 5A-5G without deviating from the inventive concepts of the present disclosure.

Figure 5A:
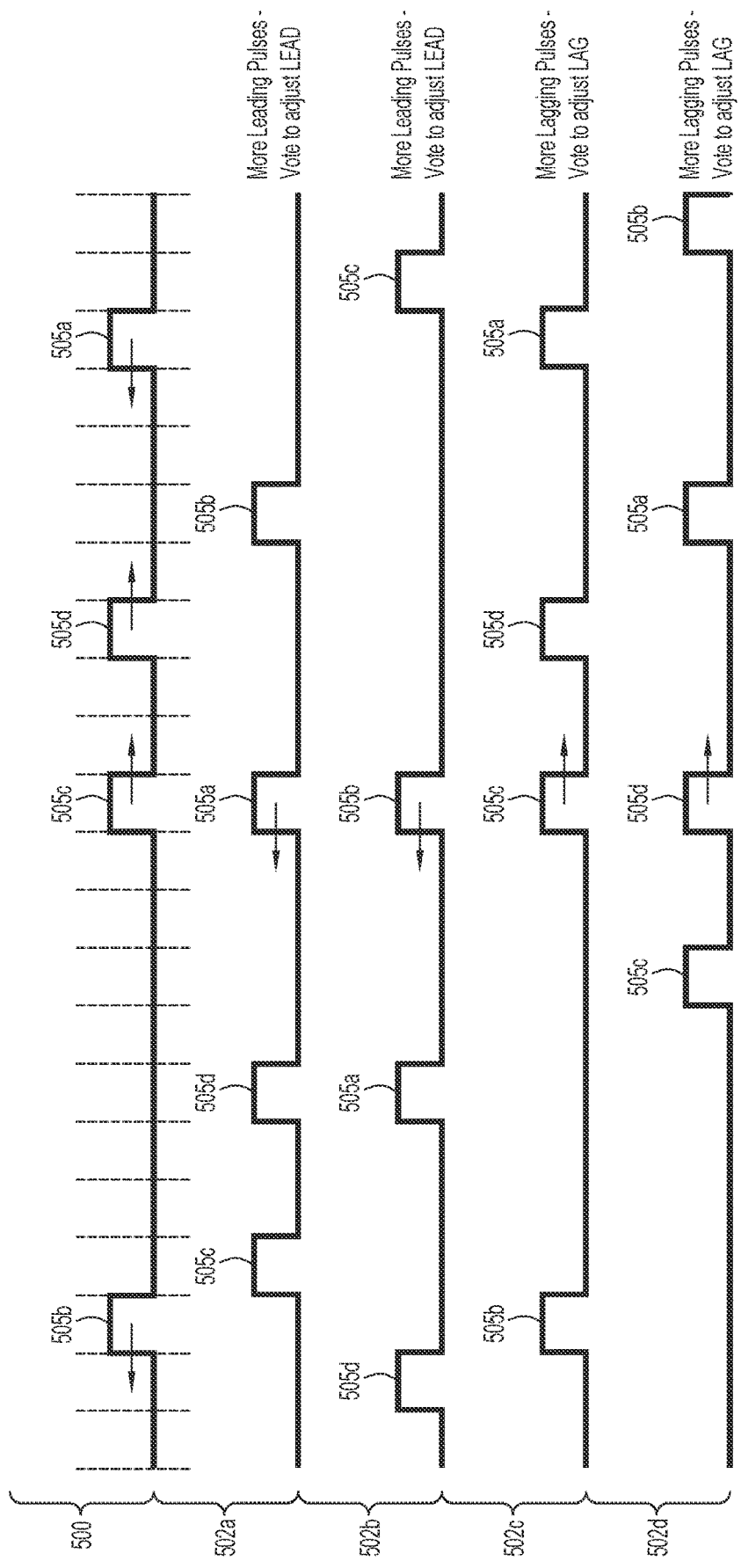

Illustrated in FIGS. 5A-5G is a phase alignment chart 500 which shows the relative phase of clock sources 505a-d. Phase alignment chart 502a shows the relative phase differences for clock sources 505a-d from the comparison of clock source 505a, phase alignment chart 502b shows the relative phase differences for clock sources 505a-d from the comparison of clock source 505b, phase alignment chart 502c shows the relative phase differences for clock sources 505a-d from the comparison of clock source 505c, and phase alignment chart 502d shows the relative phase differences for clock sources 505a-d from the comparison of clock source 505d. FIG. 5A illustrates the initial phase differences between clock sources 505a-d, FIGS. 5B-5F illustrate the phase differences between clock sources 505a-d after separate rounds of adjustment, and FIG. 5G illustrates clock sources 505a-d once they are synchronized.

As illustrated in phase alignment chart 500 of FIG. 5A, none of clock sources 505a-d are initially synchronized. As shown in phase alignment chart 502a, the majority of the external clock sources lead clock source 505a, and therefore, clock source 505a is adjusted to the left of FIG. 5A. As shown in phase alignment chart 502b, the majority of the external clock sources also lead clock source 505b, and therefore, clock source 505b is adjusted to the left of FIG. 5A. As shown in phase alignment chart 502c, the majority of the external clock sources lag clock source 505c, and therefore, clock source 505c is adjusted to the right of FIG. 5A. Finally, as shown in phase alignment chart 502d, the majority of the external clock sources lead clock source 505d, and therefore, clock source 505d is adjusted to the right of FIG. 5A.

Figure 5B:
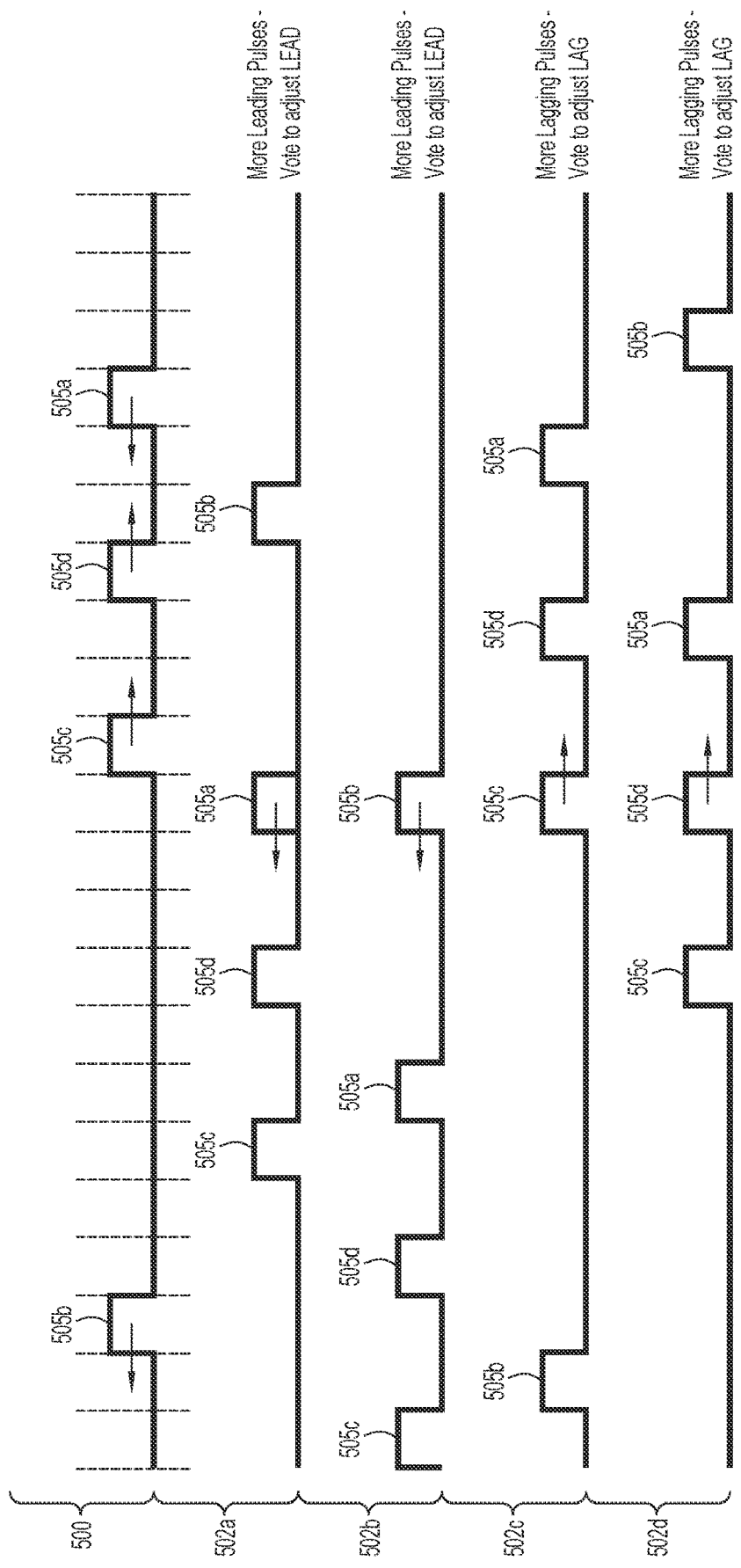

After the adjustments implemented in response to the determinations described above with reference to FIG. 5A, the relative phases of clock sources 505a-d have begun to synchronize, as illustrated in phase alignment chart 500 of FIG. 5B. Yet, all of the clock sources 505a-d remain unsynchronized, and clock source 505b remains a fairly strong outlier. Accordingly, another round of adjustment is implemented. As shown in phase alignment chart 502a, the majority of the external clock sources lead clock source 505a, and therefore, clock source 505a is adjusted to the left of FIG. 5B. As shown in phase alignment chart 502b, the majority of the external clock sources also lead clock source 505b, and therefore, clock source 505b is adjusted to the left of FIG. 5B. As shown in phase alignment chart 502c, the majority of the external clock sources lag clock source 505c, and therefore, clock source 505c is adjusted to the right of FIG. 5B. Finally, as shown in phase alignment chart 502d, the majority of the external clock sources lag clock source 505d, and therefore, clock source 505d is adjusted to the right of FIG. 5B.

After the adjustments implemented in response to the determinations described above with reference to FIG. 5B, the relative phases of clock sources 505*a*-*d* have begun to synchronize, as illustrated in phase alignment chart 500 of FIG. 5C. Yet, all of the clock sources 505*a*-*d* are not yet synchronized. Accordingly, another round of adjustment is implemented. As shown in phase alignment chart 502*a*, clock source 505*d* is in blind window 340 with respect to clock source 505*a*, and therefore, is not used in the adjustment determination for clock source 505*a* illustrated in FIG. 5C. With clock source 505*d* not factoring into the adjustment determination for clock source 505*a*, there is one clock source leading clock source 505*a* (clock source 505*c*) and one clock source lagging clock source 505*a* (clock source 505*b*). Therefore, clock source 505*a* makes no adjustment to its phase as there is no majority of leading or trailing clock sources. As shown in phase alignment chart 502*b*, the majority of the external clock sources lead clock source 505*b*, and therefore, clock source 505*b* is adjusted to the left of FIG. 5C. As shown in phase alignment chart 502*c*, the majority of the external clock sources lag clock source 505*c*, and therefore, clock source 505*c* is adjusted to the right of FIG. 5C. Finally, as shown in phase alignment chart 502*d*, clock source 505*a* is within the blind window with respect to clock source 505*d*, and therefore, is not used in the adjustment determination for clock source 505*d* illustrated in FIG. 5C. With clock source 505*a* not factoring into the adjustment determination, there is one clock source leading clock source 505*d* (clock source 505*c*) and one clock source lagging clock source 505*d* (clock source 505*b*). As there is no majority of leading or lagging clock sources relative to clock source 505*d*, clock source 505*d* makes no adjustment to its phase.

Figure 5D:
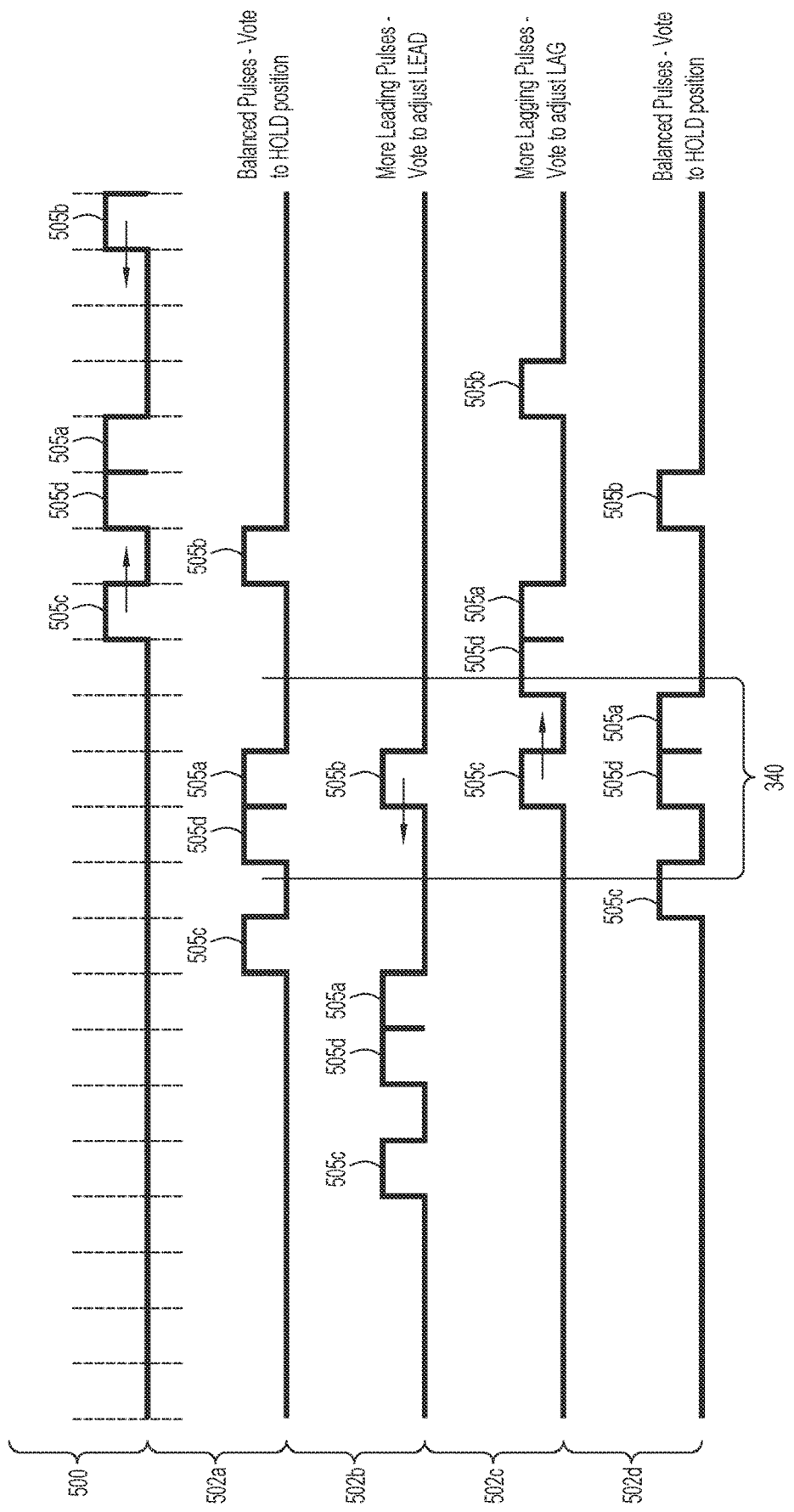

After the adjustments implemented in response to the determinations described above with reference to FIG. 5C, the relative phases of clock sources 505*a*-*d* continue to synchronize, as illustrated in phase alignment chart 500 of FIG. 5D. Yet, all of the clock sources 505*a*-*d* are not yet synchronized. Accordingly, another round of adjustment is implemented. As shown in phase alignment chart 502*a* of FIG. 5D, clock source 505*d* is in blind window 340 with respect to clock source 505*a*, and therefore, is not used in the adjustment determination for clock source 505*a* illustrated in FIG. 5D. With clock source 505*d* not factoring into the adjustment determination of FIG. 5D, there is one clock source leading clock source 505*a* (clock source 505*c*) and one clock source lagging clock source 505*a* (clock source 505*b*). Therefore, clock source 505*a* makes no adjustment to its phase. As shown in phase alignment chart 502*b*, the majority of the external clock sources lead clock source 505*b*, and therefore, clock source 505*b* is adjusted to the left of FIG. 5D. As shown in phase alignment chart 502*c*, the majority of the external clock sources lag clock source 505*c*, and therefore, clock source 505*c* is adjusted to the right of FIG. 5D. Finally, as shown in phase alignment chart 502*d*, clock source 505*a* is within the blind window with respect to clock source 505*d*, and therefore, is not used in the adjustment determination for clock source 505*d* illustrated in FIG. 5D. With clock source 505*a* not factoring into the adjustment determination of FIG. 5D, there is one clock source leading clock source 505*d* (clock source 505*c*) and one clock source lagging clock source 505*d* (clock source 505*b*). Therefore, clock source 505*d* makes no adjustment to its phase.

Figure 5E:
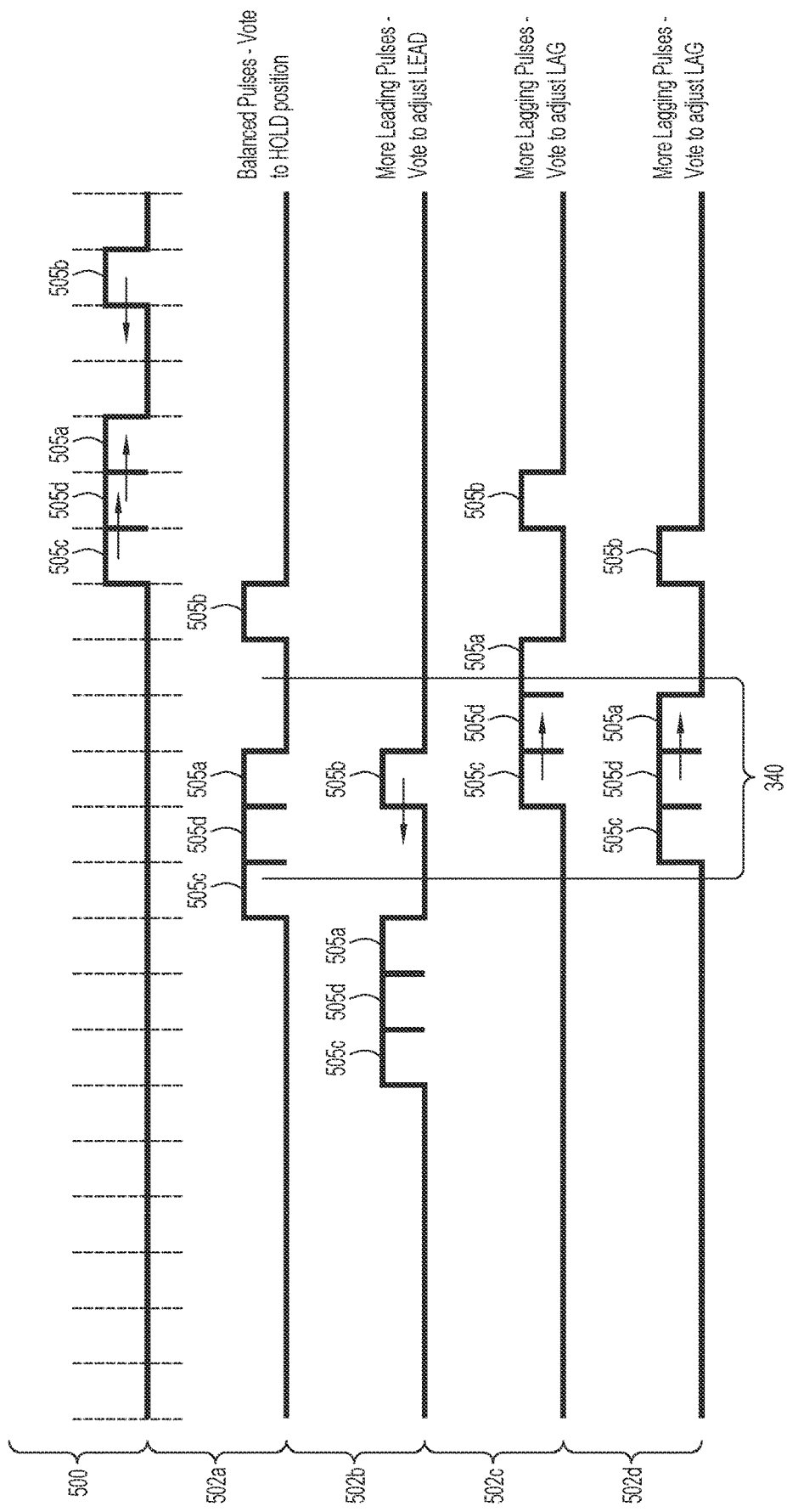

After the adjustments implemented in response to the determinations described above with reference to FIG. 5D, the relative phases of clock sources 505*a*-*d* continue to synchronize, as illustrated in phase alignment chart 500 of FIG. 5E. Yet, all of the clock sources 505*a*-*d* are not yet synchronized. Accordingly, another round of adjustment is implemented. As shown in phase alignment chart 502*a* of FIG. 5E, clock source 505*d* is in blind window 340 with respect to clock source 505*a*, and therefore, is not used in the adjustment determination for clock source 505*a* illustrated in FIG. 5E. With clock source 505*d* not factoring into the adjustment determination of FIG. 5E, there is one clock source leading clock source 505*a* (clock source 505*c*) and one clock source lagging clock source 505*a* (clock source 505*b*). Therefore, clock source 505*a* makes no adjustment to its phase. As shown in phase alignment chart 502*b*, the majority of the external clock sources lead clock source 505*b*, and therefore, clock source 505*b* is adjusted to the left of FIG. 5E. As shown in phase alignment chart 502*c* of FIG. 5E, clock source 505*d* is in blind window 340 relative to clock source 505*c*, but the majority of the external clock sources lag clock source 505*c*. Therefore, clock source 505*c* is adjusted to the right of FIG. 5E. Finally, as shown in phase alignment chart 502*d*, clock source 505*a* is within the blind window with respect to clock source 505*d*, as is clock source 505*a*. There is one clock source lagging clock source 505*d* (clock source 505*b*). Therefore, clock source 505*d* is adjusted to the right of FIG. 5E.

After the adjustments implemented in response to the determinations described above with reference to FIG. 5E, the relative phases of clock sources 505*a*-*d* continue to synchronize, as illustrated in phase alignment chart 500 of FIG. 5F, with all but clock source 505*b* being within the blind window for each of clock sources 505*a*, 505*b* and 505*d*. Because clock source 505*b* is not yet synchronized, another round of adjustment is implemented. As shown in phase alignment chart 502*a* of FIG. 5F, clock sources 505*c* and 505*d* are in blind window 340 with respect to clock source 505*a*, while clock source 505*b* lags clock source 505*a*. Therefore, clock source 505*a* adjusts to the right of FIG. 5F. As shown in phase alignment chart 502*b*, the majority of the external clock sources lead clock source 505*b*, and therefore, clock source 505*b* is adjusted to the left of FIG. 5F. As shown in phase alignment chart 502*c* of FIG. 5F, only lagging clock source 505*b* is outside the blind window 340 relative to clock source 505*c*, and therefore, clock source 505*c* is adjusted to the right of FIG. 5E. Finally, as shown in phase alignment chart 502*d* of FIG. 5F, only lagging clock source 505*b* is outside the blind window 340 relative to clock source 505*d*. Therefore, clock source 505*d* is adjusted to the right of FIG. 5F.

Finally, as shown in FIG. 5G, after the adjustments described above with reference to FIG. 5F, all of clock sources 505*a*-*d* are within blind window 340 with respect to teach other. Therefore, all of clock sources 505*a*-*d* are synchronized and no further adjustments are necessary.

Figure 6:
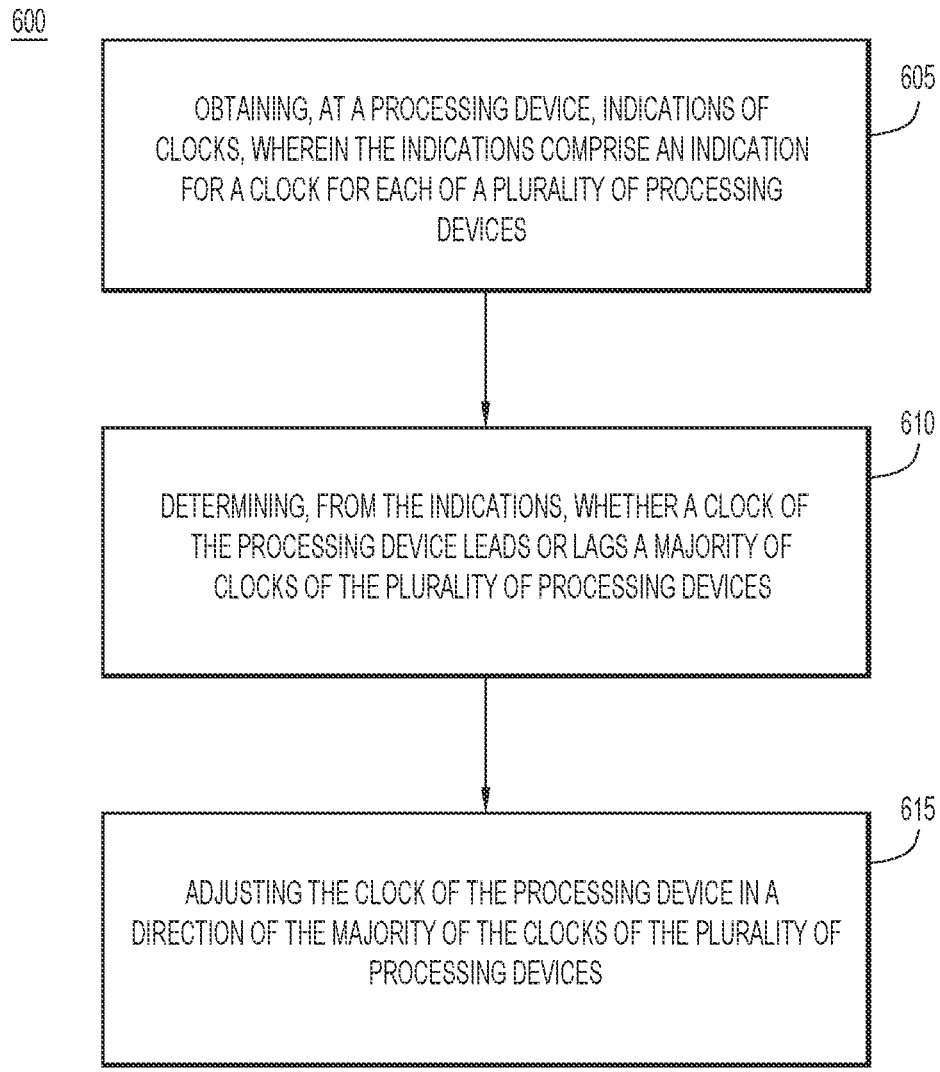

With reference now made to FIG. 6, depicted therein is a flowchart 600 illustrating a first process flow for implementing the techniques of the present disclosure. Flowchart 600 begins in operation 605 where indications of clocks are received at a processing device. The indications comprise an indication for a clock for each of a plurality of processing devices. For example, operation 605 may be embodied as a system of flight group computers sharing their clock signals so that the clock sources of the computers may be synchronized across the flight group. The "processing device" of operation 605 may be a local computer within the flight group, and the "plurality of processing device" may be computers associated with other members of the flight group.

In operation 610, it is determined, at the processing device from the indications, whether a clock of the processing device leads or lags a majority of clocks of the plurality of the processing devices. For example, operation 610 may be embodied as a determination of a phase difference between a local clock source and a plurality of other clock sources, as described above with reference to FIGS. 2, 3 and 5A-5F. Operation 610 may also be implemented in conjunction with the blind window, critical window, and locked window techniques described above with reference to FIGS. 3 and 4. For example, in determining whether a clock of the processing device leads or lags a majority of clocks of the plurality of processing devices, the processing device may omit processing devices of the plurality of processing devices whose phase falls within the blind window.

Finally, in operation 615 the clock of the processing device is adjusted in the direction of the majority of the clocks of the plurality of processing devices. For example, if it determined that the clock of the processing device lags that of the majority, the phase of the clock of the processing device may be adjusted forwards to approach the phase(s) of the majority. On the other hand, if it is determined that the clock of the processing device leads that of the majority, the phase of the clock of the processing device may be adjusted backwards to approach the phase(s) of the majority.

Figure 7:
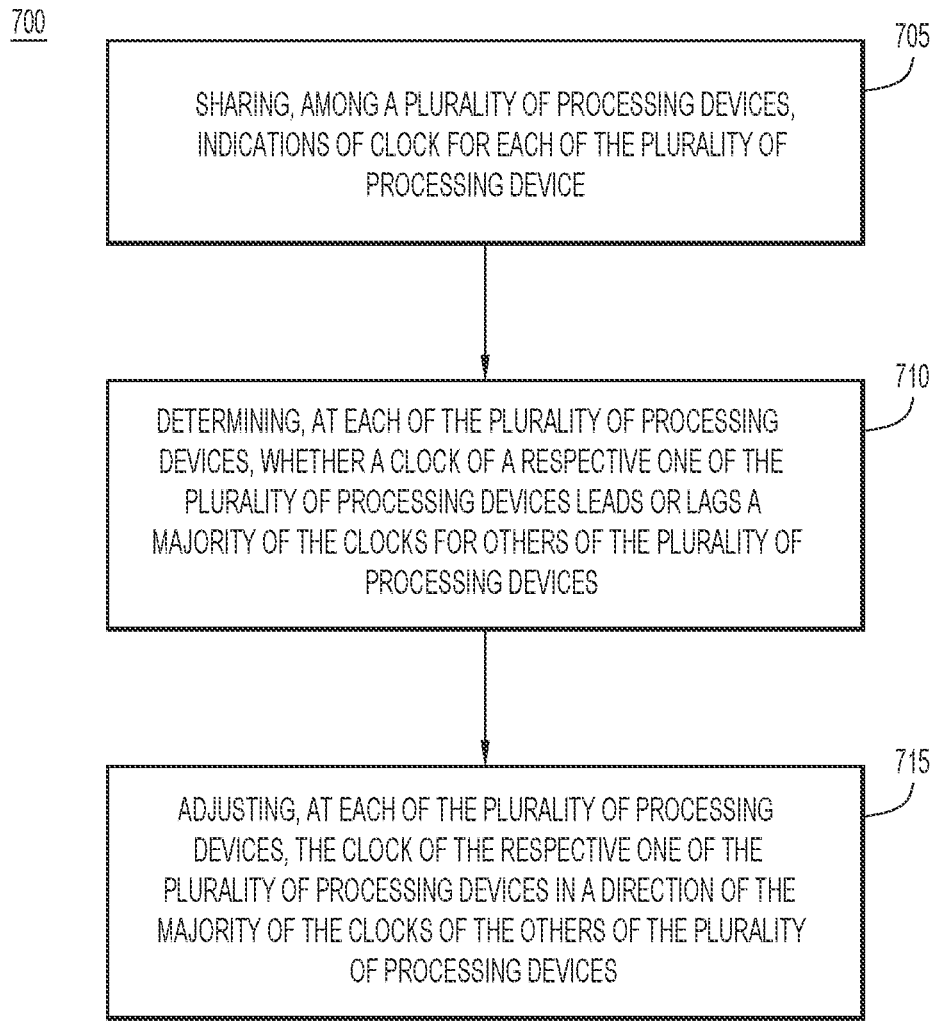

With reference now made to FIG. 7, depicted therein is a flowchart 700 illustrating a second process flow for implementing the techniques of the present disclosure. Flowchart 700 begins in operation 705 where indications of clocks for a plurality of processing devices are shared among the plurality of processing devices. For example, operation 705 may be embodied as a flight group of flight computers sharing their clock signals so that the clock sources of the flight computers may be synchronized across the flight group.

In operation 710, each of the plurality of processing devices determines whether its respective clock leads or lags a majority of the clocks of the others of the plurality of processing devices. For example, operation 710 may be embodied as the determination of the phase adjustments described above with reference to FIGS. 5A-5F. Operation 710 may also be implemented in conjunction with the blind window, critical window, and locked window techniques described above with reference to FIGS. 3 and 4.

Finally, in operation 715 the clock of the respect one of the plurality of processing devices is adjusted at each of the plurality of processing devices in the direction of the majority of the clocks of the others of the plurality of processing devices. For example, if it determined that the clock of one of the processing devices lags that of the majority, the phase of the respective clock may be adjusted forwards to approach the phase(s) of the majority. On the other hand, if it is determined that the clock of the processing device leads that of the majority, the phase of the respective clock may be adjusted backwards to approach the phase(s) of the majority.

Figure 8:
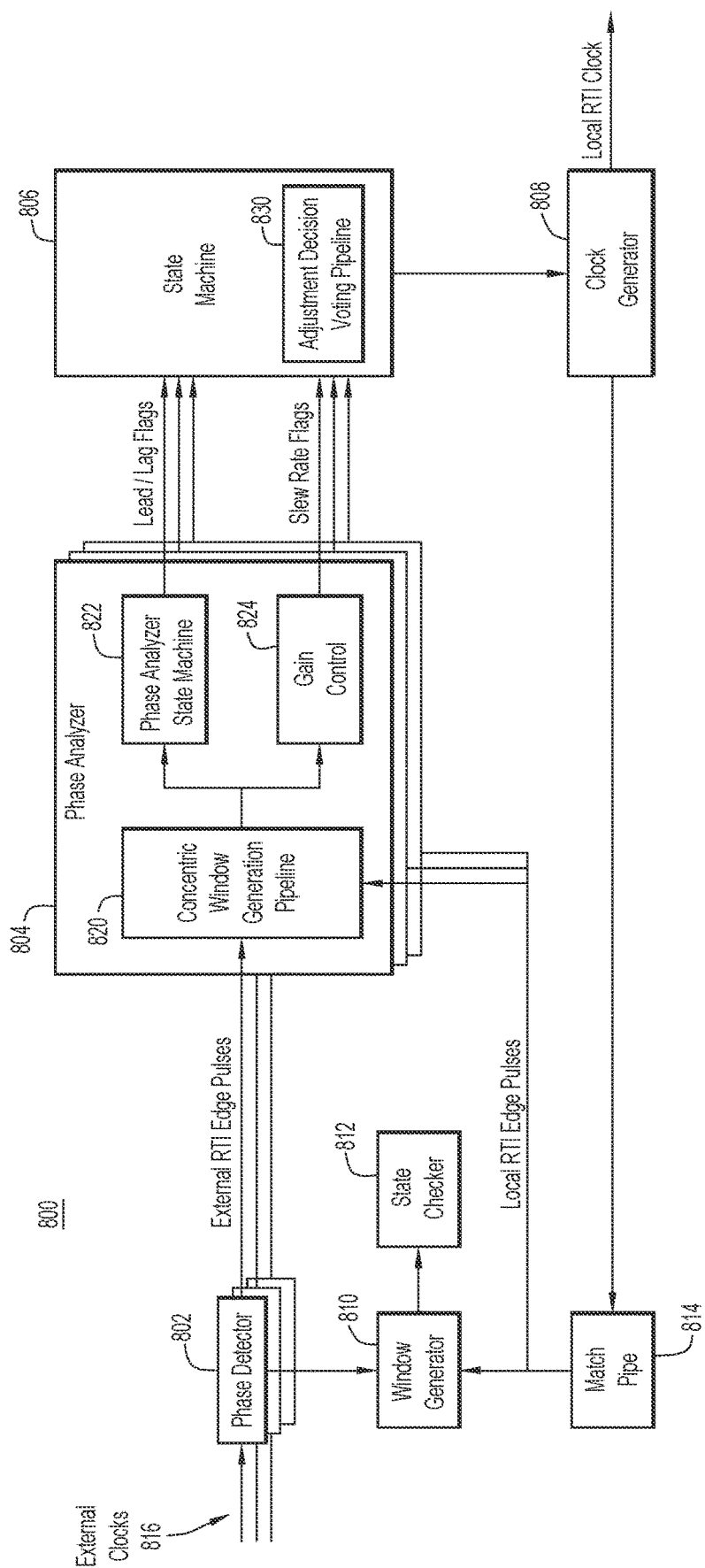

With reference now made to FIG. 8, depicted therein is a block diagram of logic 800 configured to implement the techniques of the present disclosure. Included in logic 800 is phase detector 802, phase analyzer 804, state machine 806, clock generator 808, window generator 810, a state check 812, and a match pipeline 814.

Phase detector 802 receives external clocks 816, and detects the phase of the clocks. For example, phase detector 802 may be configured to detect rising edges in the received external clocks 816. As illustrated in FIG. 8, a separate phase detector 802 may be instantiated for each external clock 816. Phase detector 802 passes the detected phases for the external clocks 816, embodied as RTI rising edge pulses in certain example embodiments, to phase analyzer 804. Phase analyzer 804 analyzes the phase to determine whether or not the phase of the external clocks 816 leads or lags that of the internal clock. Specifically, included in phase analyzer 804 are window generation pipeline 820, phase analyzer state machine 822 and gain control 824. Window generation pipeline 820 determines where within one of the above-described windows, e.g., blind window 340, critical window 345 or locked window 350, the phases received from phase detector 802 fall. Phase analyzer state machine 822 determines whether or not the phase leads or lags that of the internal clock phase, and gain control 824 sets the gain based on the window in which the external phase falls. More specifically, the gain set by the gain control 824 determines the amount of adjustment that will be applied. As with phase detector 802, a different phase analyzer 804 may be instantiated for each external clock.

The outputs from phase analyzer state machine 822 and gain control 824 are provided to state machine 806. For example, phase analyzer state machine 822 may pass lead/lag flags to state machine 806, while gain control 824 may pass slew flags to state machine 806, and more specifically to voting pipeline 830. When a different phase analyzer 804 is instantiated for each external clock, state machine 806 receives an output from a phase analyzer state machine 822 and a gain control 824 for each external clock. Based on these inputs, state machine 806 determines how clock generator 808 should adjust the phase of the internal clock. For example, state machine 806 will determine from each of the inputs from phase analyzer state machine 822 which, if any, of the external clocks 816 are within the locked window, the critical window, or the blind window. Similarly, state machine 806 determines the amount of adjustment that would be applied based on the inputs received from gain control 824. For example, if all of the inputs from phase analyzer state machine 822 indicate that all of the external clocks are in the blind window, then no adjustment will be applied to the internal clock. If any of the inputs from phase analyzer state machine 822 indicate that at least one of the external clocks is within in the critical window, then the decreased gain associated with such an external clock provided by gain control 824 is used to adjust the internal clock. If the inputs from phase analyzer state machine 822 indicate that all of the external clocks are outside the critical window, then the increased gain provided by gain control 824 is used to adjust the internal clock.

Included in state machine 806 is voting pipeline 830. Voting pipeline 830 stores the latest desired adjustment on every clock cycle, and will only apply that adjustment to clock generator 808 if all the decisions in voting pipeline 830 are the same. In other words, the same decision would have to be made several times for the stored decision to be applied from voting pipeline 830. This is how state machine 806 decreases or increased the rate of adjustment based upon the presence or absence of external clocks within the locked window. The use of voting pipeline 830 may avoid oscillations from constant fine adjustments because of the delay in feedback from external clocks 816 based on their own phase adjustments. The depth of voting pipeline 830 directly determines the slower sampling rate in the locked window. Similarly, different setting of voting pipeline 830 may be used to change the adjustment rate when external clocks are inside the locked window, but outside the critical window. For example, if an external clock is outside of the locked window, state machine 806 may be allowed to bypass the voting pipeline 830, thereby increasing the feedback sample rate.

Also illustrated is window generator 810 which creates start and stop pulses around the local clock generator's rising edge that represent a phase window that is used to qualify if the entire cluster of clock pulses is in sync. A copy of the local clock signal created in generation logic 808 is phase adjusted in match pipe 814 to align with the metastability compensation phase delay induced in phase detector logic 802. If all external clock rising edges are within this window of the compensated local clock's rising edge, the entire cluster is considered in sync. Logic group 812 checks for these conditions and records that status to make it available to any supervisory logic, by way of status registers.

Figure 9:
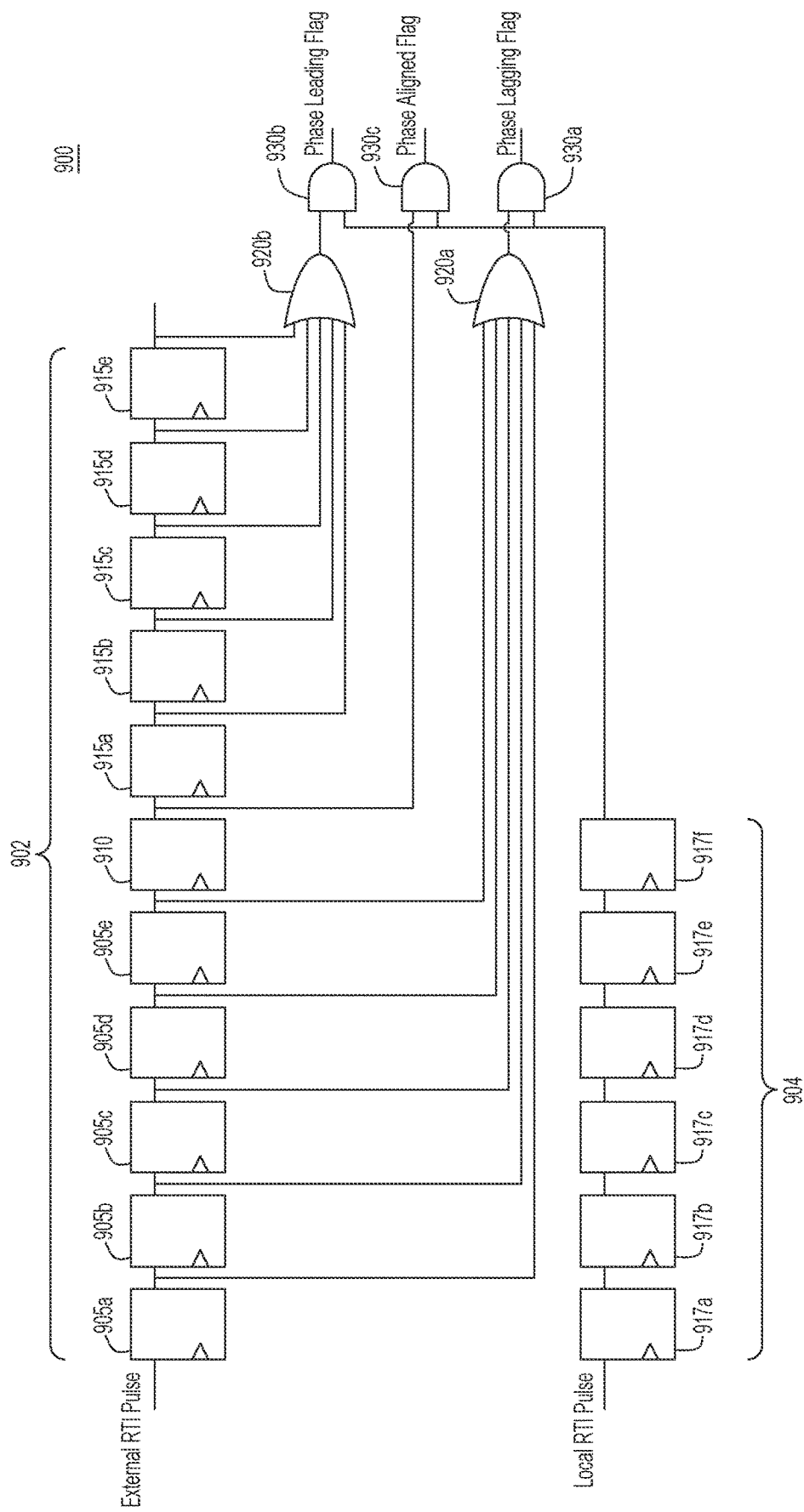

With reference now made to FIG. 9, depicted therein is example logic 900 configured to implement the techniques of the present disclosure. More specifically, logic 900 may be implemented within, for example, a phase analyzer, such as phase analyzer 804 of FIG. 8. Logic 900 includes one-bit register pipelines 902 and 904 that may be used to look forward or back in discrete time, which is effectively leading and lagging in phase. By sending external clock signal edge events into pipeline 902, and the local clock signal edge events into pipeline 904, the logic can detect phase alignments/misalignments.

Logic 900 works by triggering a pulse when the local clock signal pulse is seen at the final tap 917f of pipeline 904. At this moment, the taps 905a-e located earlier in the external clock signal event pipeline 902 are all connected to an OR-reduction gate 920a, and the same is true for the taps 915a-e located later in the pipeline 902. Tap 910 is arranged within the blind window of pipeline 902. If the external clock signal event pulse was in the pipeline 902 earlier, the OR-reduction gate 920a on that side will show a "1" fall through, and OR-reduction gate 920b will show a zero. If the external clock signal event pulse was in the pipeline 902 later, the "1" will fall through OR-reduction gate 920b, and OR-reduction gate 920a will show a zero. If the external clock signal event pulse is within the blind window, then gate 930c will be fed a "1" via tap 910.

Taps 917a-f ensure that pipeline 904 always sends the pulse for the rising edge of the local clock, which is why there are the same number of taps in pipeline 904 (i.e., the six taps 917a-f) as there are in pipeline 902 leading up to and including tap 910 (i.e., the six taps 905a-e and 910), which is the tap that signals that the external clock is in phase with the internal clock.

The outputs of OR-reduction gates 920a and 920b are provided to AND gates 930a-c, such that AND gate 930a gives a "1" when the external clock pulse leads the internal clock pulse, AND gate 930b gives a "1" when the external clock pulse is synchronized with the internal clock pulse, and AND gate 930c gives a "1" when the external clock pulse lags the internal clock pulse.

Through the logic elements described above, logic 900 may detect if the phase of an external clock is leading or lagging an internal clock, and within a certain window of the local clock signal using no counters and no arithmetic. Instead, logic 900 uses a handful on single-bit registers or taps 905a-5, 910, 915a-e and 917a-f. When multiple windows are arranged concentrically, logic 900 may determine coarse distances of events for things like gain adjustment and synchronization status using few resources.

Figure 10:
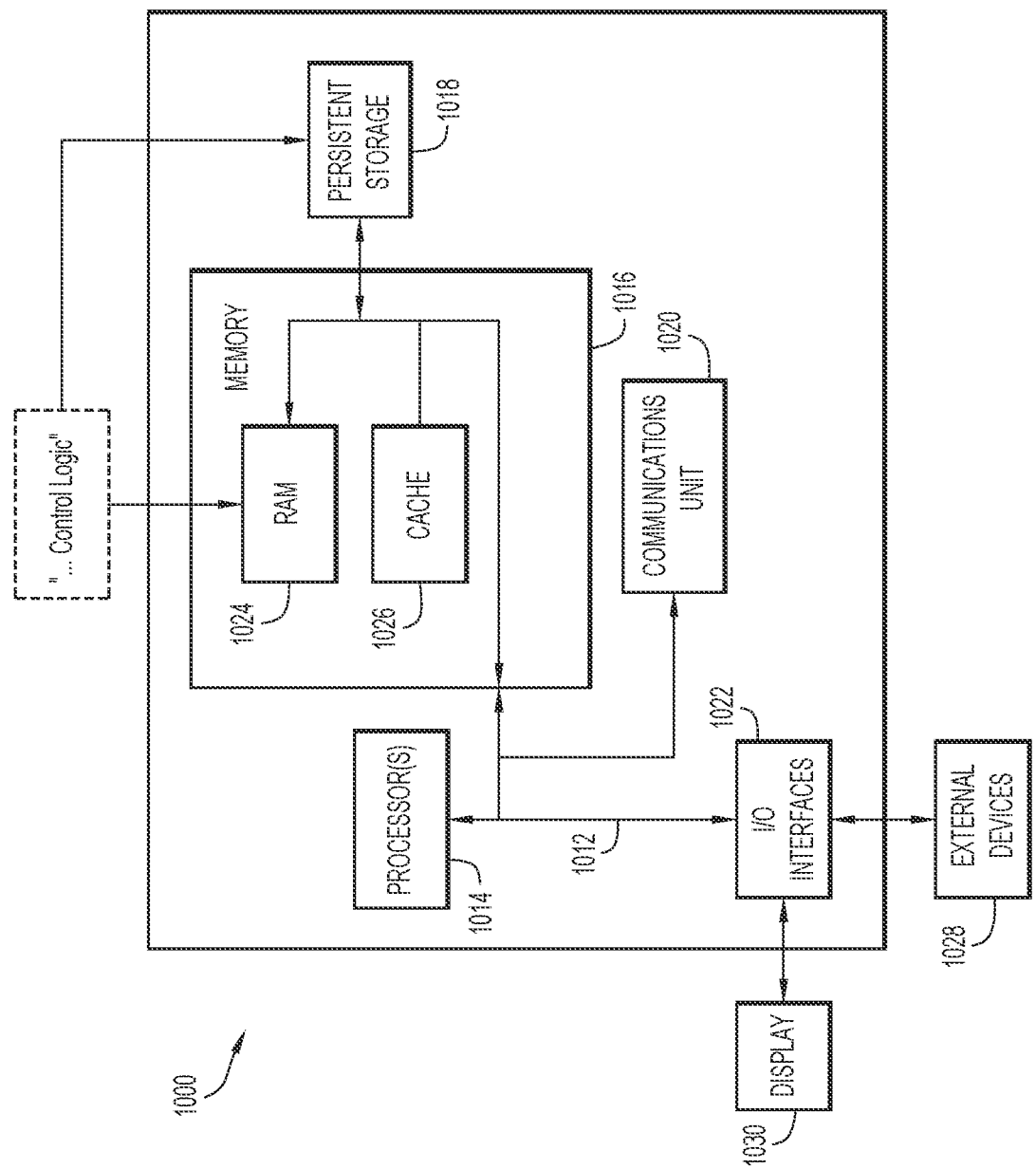

With reference now made to FIG. 10, illustrated therein a hardware block diagram of a computing device 1000 that may perform the clock synchronization techniques of the present disclosure. It should be appreciated that FIG. 10 provides only an illustration of one embodiment and does not imply any limitations with regard to the environments in which different embodiments may be implemented. Many modifications to the depicted environment may be made.

As depicted, the device 1000 includes a bus 1012, which provides communications between computer processor(s) 1014, memory 1016, persistent storage 1018, communications unit 1020, and input/output (I/O) interface(s) 1022. Bus 1012 can be implemented with any architecture designed for passing data and/or control information between processors (such as microprocessors, communications and network processors, etc.), system memory, peripheral devices, and any other hardware components within a system. For example, bus 1012 can be implemented with one or more buses. I/O interfaces 1022 may be configured to receive data from external devices 1028. Examples of such external devices may include other processing devices with reference or system clocks, as described above with reference to FIGS. 1-4 and 5A-G.

Memory 1016 and persistent storage 1018 are computer readable storage media. In the depicted embodiment, memory 1016 includes random access memory (RAM) 1024 and cache memory 1026. In general, memory 1016 can include any suitable volatile or non-volatile computer readable storage media. Instructions for the clock synchronization techniques of the present disclosure may be stored in memory 1016 or persistent storage 1018 for execution by processor(s) 1014. The control logic stored in memory 1016 or persistent storage 1018 may implement the clock synchronization techniques of the present disclosure. Additionally, memory 1016 and/or persistent storage 1018 may store the data received from, for example, the processing devices with reference or system clocks, as described above with reference to FIGS. 1-4 and 5A-G.

One or more programs may be stored in persistent storage 1018 for execution by one or more of the respective computer processors 1014 via one or more memories of memory 1016. The persistent storage 1018 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1018 may also be removable. For example, a removable hard drive may be used for persistent storage 1018. Other examples include optical and magnetic disks, thumb drives, and smart cards that are inserted into a drive for transfer onto another computer readable storage medium that is also part of persistent storage 1018.

Communications unit 1020, in these examples, provides for communications with other data processing systems or devices. In these examples, communications unit 1020 includes one or more network interface cards. Communications unit 1020 may provide communications through the use of either or both physical and wireless communications links. Finally, computing device 1000 may include an optional display 1030.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining, at a processing device, indications of clocks, wherein the indications comprise an indication for a clock for each of a plurality of processing devices;
   determining, from the indications, whether a clock of the processing device leads or lags a majority of clocks of the plurality of processing devices;
   adjusting the clock of the processing device in a direction of the majority of the clocks of the plurality of processing devices;
   obtaining, after the adjusting, second indications of the clocks;
   determining, from the second indications, that the clocks for all of the plurality of processing devices are within a blind time window relative to the clock of the processing device; and
   determining that the clock of the processing device and the clocks of the plurality of processing devices are synchronized.

2. The method of claim 1, wherein determining whether the clock of the processing device leads or lags the majority of the clocks of the plurality of processing devices comprises ignoring clocks within the blind time window relative to the clock of the processing device.

3. The method of claim 1, wherein adjusting the clock of the processing device in the direction of the majority of the clocks of the plurality of processing devices comprises determining that at least one of the clocks for the plurality of processing devices is within a critical time window relative to the clock of the processing device and determining an amount of adjustment based upon the at least one of the clocks for the plurality of processing devices being within the critical time window.

4. The method of claim 1 further comprising:
   determining that the clocks for all of the plurality of processing devices are outside of a locked time window relative to the clock of the processing device; and
   increasing a rate at which the processing device obtains subsequent indications of the clocks.

5. The method of claim 1, wherein obtaining the indications of the clocks comprises obtaining, for each of the clocks, a pulse indicative of a phase of a respective one of the clocks relative to a phase of the clock of the processing device.

6. The method of claim 5, wherein determining whether the clock of the processing device leads or lags the majority of clocks of the plurality of processing devices comprises comparing the phase of a respective one of the clocks to the phase of the clock of the processing device.

7. The method of claim 5, wherein the pulse indicative of the phase of the respective one of the clocks comprises a pulse indicative of a rising edge of a clock signal for the respective one of the clocks.

8. A method comprising:
   sharing, among a plurality of processing devices, indications of a clock for each of the plurality of processing devices;
   determining, at each of the plurality of processing devices, whether a local clock of a respective one of the plurality of processing devices leads or lags a majority of the clocks for others of the plurality of processing devices;
   adjusting, at each of the plurality of processing devices, the clock of the respective one of the plurality of processing devices in a direction of the majority of the clocks of the others of the plurality of processing devices;
   sharing, among a plurality of processing devices after the adjusting, second indications of the clock for each of the plurality of processing devices;
   determining that the clocks for all of the plurality of processing devices are within a blind time window relative to the clocks for all of the plurality of processing devices; and
   determining that the clocks of the plurality of processing devices are synchronized.

9. The method of claim 8, wherein determining whether the local clock of the respective one of the plurality of processing devices leads or lags the majority of the clocks for others of the plurality of processing devices comprises ignoring clocks within blind time window relative to the respective one of the plurality of processing devices.

10. The method of claim 8, wherein adjusting the clock of the respective one of the plurality of processing devices in the direction of the majority of the clocks of the others of the plurality of processing devices comprises determining that at least one of the clocks of the others of the plurality of processing devices is within a critical time window relative to the clock of the respective one of the plurality of processing devices and determining an amount of adjustment based upon the at least one of the clocks of the others of the plurality of processing devices being within the critical time window.

11. The method of claim 8, further comprising:
    determining that the clocks for all of the plurality or processing devices are outside of a locked time window relative to the clock of the processing device; and
    increasing a rate at which the plurality of processing devices share the indications of the clock for each of the plurality of processing devices.

12. The method of claim 8, wherein sharing the indications of the clock for each of the plurality of processing devices comprises sharing, among the plurality of processing devices, a pulse indicative of a phase of the clock for each of the plurality of processing devices.

13. The method of claim 12, wherein determining whether the local clock of the respective one of the plurality of processing devices leads or lags the majority of the clocks for others of the plurality of processing devices comprises comparing the phase of the local clock of the respective one of the plurality of processing devices to the phase of the clocks for others of the plurality of processing devices.

14. The method of claim 12, wherein the pulse indicative of a phase of the clock for each of the plurality of processing devices comprises a pulse indicative of a rising edge of a clock signal for each of the plurality of processing devices.

15. An apparatus comprising:
    one or more network interfaces; and
    one or more processors configured to:
      obtain, via the one or more network interfaces, indications of clocks, wherein the indications comprise an indication for a clock for each of a plurality of processing devices;
      determine, from the indications, whether a clock of the apparatus leads or lags a majority of clocks of the plurality of processing devices;
      adjust the clock of the apparatus in a direction of the majority of the clocks of the plurality of processing devices;
      obtain, via the one or more network interfaces after the adjusting, second indications of the clocks;

determine, from the second indications, that the clocks for all of the plurality of processing devices are within a blind time window relative to the clock of the apparatus; and determine that the clock of the apparatus and the clocks of the plurality of processing devices are synchronized.

16. The apparatus of claim 15, wherein the one or more processors comprise one or more field programmable gate arrays.

17. The apparatus of claim 15, wherein the one or more processors comprise one or more general purpose central processing units.

18. The apparatus of claim 15, wherein the one more processors are configured with hardware instructions that determine whether the clock of the apparatus leads or lags the majority of clocks of the plurality of processing devices and adjust the clock of the apparatus in the direction of the majority of the clocks of the plurality of processing devices.

19. The apparatus of claim 15, wherein the one or more processors are configured to determine whether the clock of the apparatus leads or lags the majority of the clocks of the plurality of processing devices by ignoring clocks within the blind time window relative to the clock of the apparatus.

20. The apparatus of claim 15, wherein the one or more processors are configured to adjust the clock of the apparatus in the direction of the majority of the clocks of the plurality of processing devices by determining that at least one of the clocks for the plurality of processing devices is within a critical time window relative to the clock of the apparatus and determining an amount of adjustment based upon the at least one of the clocks for the plurality of processing devices being within the critical time window.

* * * * *